(12) United States Patent
Satoh et al.

(10) Patent No.: US 11,581,825 B2
(45) Date of Patent: Feb. 14, 2023

(54) ACOUSTIC DEVICE WITH A PIEZOELECTRIC ELEMENT

(71) Applicant: TDK Corporation, Tokyo (JP)

(72) Inventors: Akira Satoh, Tokyo (JP); Yoshikazu Shimura, Tokyo (JP); Kaoru Kijima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 305 days.

(21) Appl. No.: 16/871,410

(22) Filed: May 11, 2020

(65) Prior Publication Data

US 2020/0373858 A1 Nov. 26, 2020

(30) Foreign Application Priority Data

May 20, 2019 (JP) .............................. JP2019-094370

(51) Int. Cl.
*H02N 2/00* (2006.01)
*B06B 1/06* (2006.01)

(52) U.S. Cl.
CPC ........... *H02N 2/005* (2013.01); *B06B 1/0648* (2013.01); *H02N 2/004* (2013.01)

(58) Field of Classification Search
CPC .......... H02N 2/005; H02N 2/004; H04R 1/06; H04R 1/2849; H04R 17/00; B06B 1/0648; B06B 1/0603
See application file for complete search history.

(56) References Cited

U.S. PATENT DOCUMENTS

| | | | | |
|---|---|---|---|---|
| 6,307,300 B1 * | 10/2001 | Yamamoto | ............. | G10K 9/122 310/345 |
| 6,472,797 B1 * | 10/2002 | Kishimoto | ............. | H04R 17/00 310/324 |
| 2005/0023937 A1 * | 2/2005 | Sashida | ................. | B06B 1/0611 310/348 |
| 2007/0108874 A1 | 5/2007 | Okazaki et al. | | |

FOREIGN PATENT DOCUMENTS

| | | |
|---|---|---|
| JP | 2003-342544 A | 12/2003 |
| JP | 2006-050309 A | 2/2006 |
| JP | 2006-211412 A | 8/2006 |
| JP | WO2006-016443 A1 | 5/2008 |
| JP | 2016-032240 A | 3/2016 |

\* cited by examiner

*Primary Examiner* — Emily P Pham
(74) *Attorney, Agent, or Firm* — Oliff PLC

(57) ABSTRACT

An acoustic device includes a piezoelectric element, an attachment member to which the piezoelectric element is attached, and a spacer. The piezoelectric element includes first and second principal surfaces opposing each other. The attachment opposes the first principal surface. The spacer is disposed between the piezoelectric element and the attachment member in such a manner as to form an acoustic space between the piezoelectric element and the attachment member. The spacer includes an adhesive layer including a principal surface in contact with the first principal surface and a principal surface in contact with the attachment member.

10 Claims, 6 Drawing Sheets

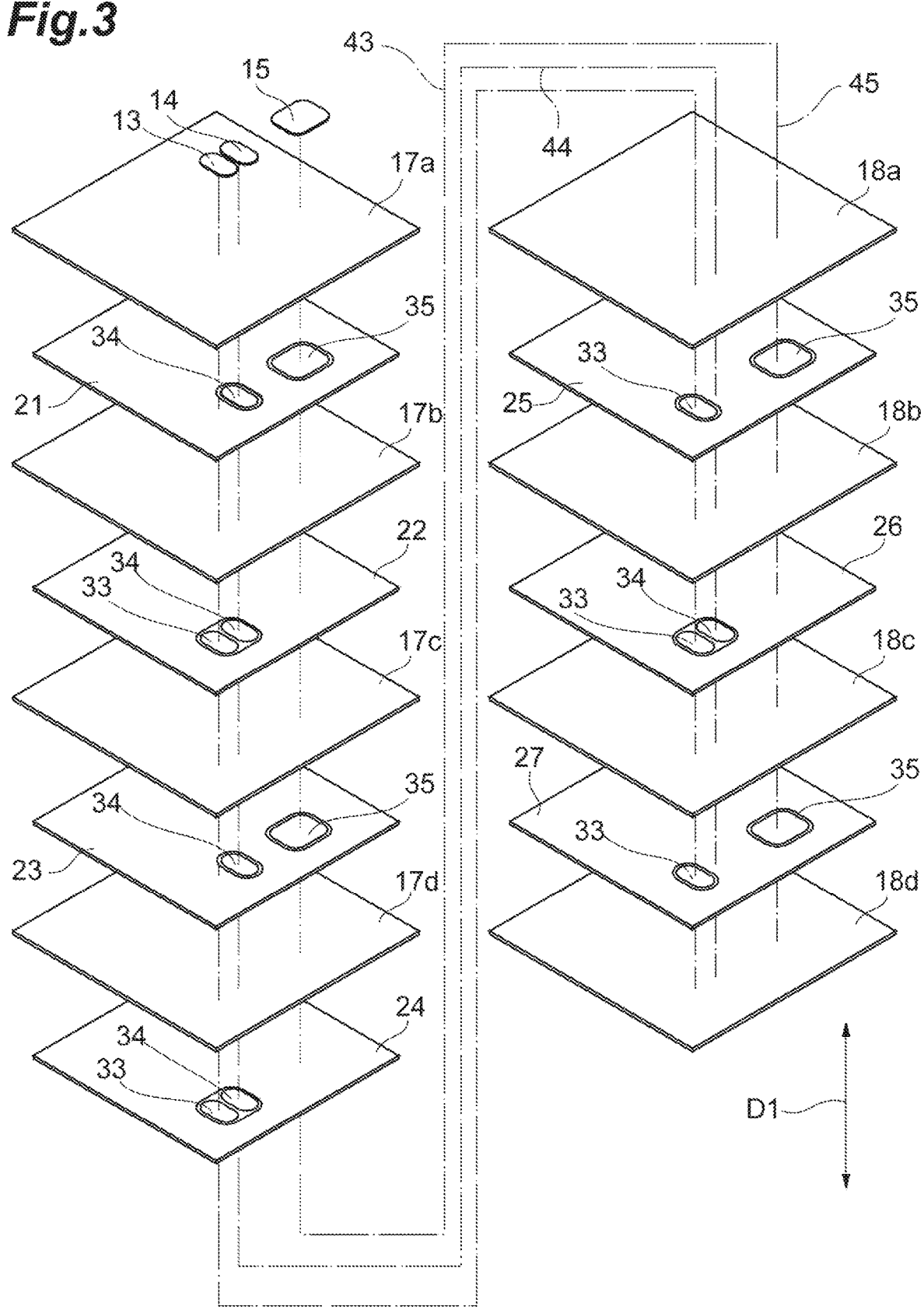

Fig.6

| SAMPLE | TENSILE STRENGTH [N/cm] | DISPLACEMENT [%] | SOUND PRESSURE LEVEL [dB] |
|---|---|---|---|
| 1 | 5 | 70 | 73.2 |
| 2 | 6 | 74 | 72 |
| 3 | 7 | 77 | 74 |
| 4 | 8 | 82 | 77 |
| 5 | 10 | 92 | 81 |
| 6 | 12 | 90 | 80.2 |
| 7 | 14 | 92 | 80.7 |
| 8 | 18 | 94 | 80.7 |
| 9 | 24 | 95 | 80.2 |
| 10 | 30 | 96 | 80.5 |
| 11 | 36 | 96 | 80.8 |
| 12 | 42 | 94 | 80.2 |
| 13 | 44 | 96 | 80.1 |
| 14 | 46 | 95 | 81 |
| 15 | 48 | 95 | 80.2 |
| 16 | 50 | 72 | 72.8 |
| 17 | 58 | 70 | 73 |

ACOUSTIC DEVICE WITH A PIEZOELECTRIC ELEMENT

BACKGROUND OF THE INVENTION

1. Field of the Invention

The present invention relates to an acoustic device.

2. Description of Related Art

Known acoustic devices include a piezoelectric vibration plate that flexurally vibrates in a plate thickness direction and a housing that houses the piezoelectric vibration plate inside (for example, see Republished Patent WO2006/016443). In the acoustic device disclosed in the Republished Patent WO2006/016443, the piezoelectric vibration plate includes a metal plate and a piezoelectric element attached to the metal plate.

SUMMARY OF THE INVENTION

In a case where the acoustic device includes a housing, the acoustic device may become large. In a case where the acoustic device includes no housing, a size of the acoustic device can be miniaturized.

The housing and the piezoelectric vibration plate form an acoustic space. Therefore, the acoustic space tends not to be formed in the acoustic device including no housing. Consequently, the acoustic device including no housing tends not to secure a sound pressure characteristic.

One aspect of the present invention is to provide an acoustic device that can secure a sound pressure characteristic and is miniaturized.

An acoustic device according to one aspect includes a piezoelectric element, an attachment member to which the piezoelectric element is attached, and a spacer disposed between the piezoelectric element and the attachment member. The piezoelectric element includes first and second principal surfaces opposing each other. The attachment member opposes the first principal surface. The spacer is disposed to form an acoustic space between the piezoelectric element and the attachment member. The spacer includes an adhesive layer including a principal surface in contact with the first principal surface and a principal surface in contact with the attachment member.

In the one aspect, the acoustic space is formed by the spacer disposed between the piezoelectric element and the attachment member. That is, the piezoelectric element, the attachment member, and the spacer define the acoustic space. The piezoelectric element is attached to the attachment member with the adhesive layer because the adhesive layer has the principal surface in contact with the first principal surface and the principal surface in contact with the attachment member. Therefore, although the one aspect does not include a housing as included in the acoustic device disclosed in the Republished Patent WO2006/016443, the one aspect can secure a sound pressure characteristic. The one aspect is miniaturized.

In the one aspect, the tensile strength of the adhesive layer may be 10 N/cm or more and 48 N/cm or less.

A configuration in which the tensile strength of the adhesive layer is 10 N/cm or more and 48 N/cm or less controls a decrease in displacement of the piezoelectric element. Therefore, this configuration controls a decrease in sound pressure level.

The adhesive layer may be made of a rubber-based adhesive.

In the one aspect, the spacer may have a frame shape.

In a case where the spacer has the frame shape, the spacer forms the acoustic space easily.

In the one aspect, a slit may be formed in the spacer. In this case, the acoustic space communicates with an external space through the slit.

A configuration in which the slit is formed in the spacer can realize a desired sound pressure frequency characteristic.

In the one aspect, the spacer may include a pair of ends that are separated from each other. In this case, the acoustic space communicates with an external space through the pair of ends.

A configuration in which the spacer includes the pair of ends that are separated from each other forms an acoustic space easily and can realize a desired sound pressure frequency characteristic.

In the one aspect, a through-hole may be formed in the attachment member at a position opposing the first principal surface. In this case, the acoustic space communicates with the external space through the through-hole.

A configuration in which the through-hole is formed in the attachment member can realize a desired sound pressure frequency characteristic.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is an exploded perspective view of a piezoelectric element;

FIG. 6 is a table illustrating displacement and sound pressure level of each sample.

Hereinafter, embodiments of the present invention will be described in detail with reference to the accompanying drawings. In the following description, the same elements or elements having the same functions are denoted with the same reference numerals and overlapped explanation is omitted.

A configuration of an acoustic device 1 according to the embodiment will be described with reference to FIGS. 1 to 5. FIG. 1 is a perspective view illustrating the acoustic device according to the present embodiment. FIG. 3 is an exploded perspective view of a piezoelectric element.

As illustrated in FIGS. 1 and 2, the acoustic device 1 includes a vibration device 3 and an attachment member 60. The vibration device 3 includes a piezoelectric element 10 and a spacer 50. The piezoelectric element 10 is a bimorph-type piezoelectric element. The piezoelectric element 10 includes a piezoelectric element body 11 and a plurality of external electrodes 13, 14, and 15. In the present embodiment, the piezoelectric element 10 includes three external electrodes 13, 14, and 15. The piezoelectric element 10 is a multilayer piezoelectric element. In some cases, the attachment member 60 may be simply referred to as the "member 60".

Figure 1:
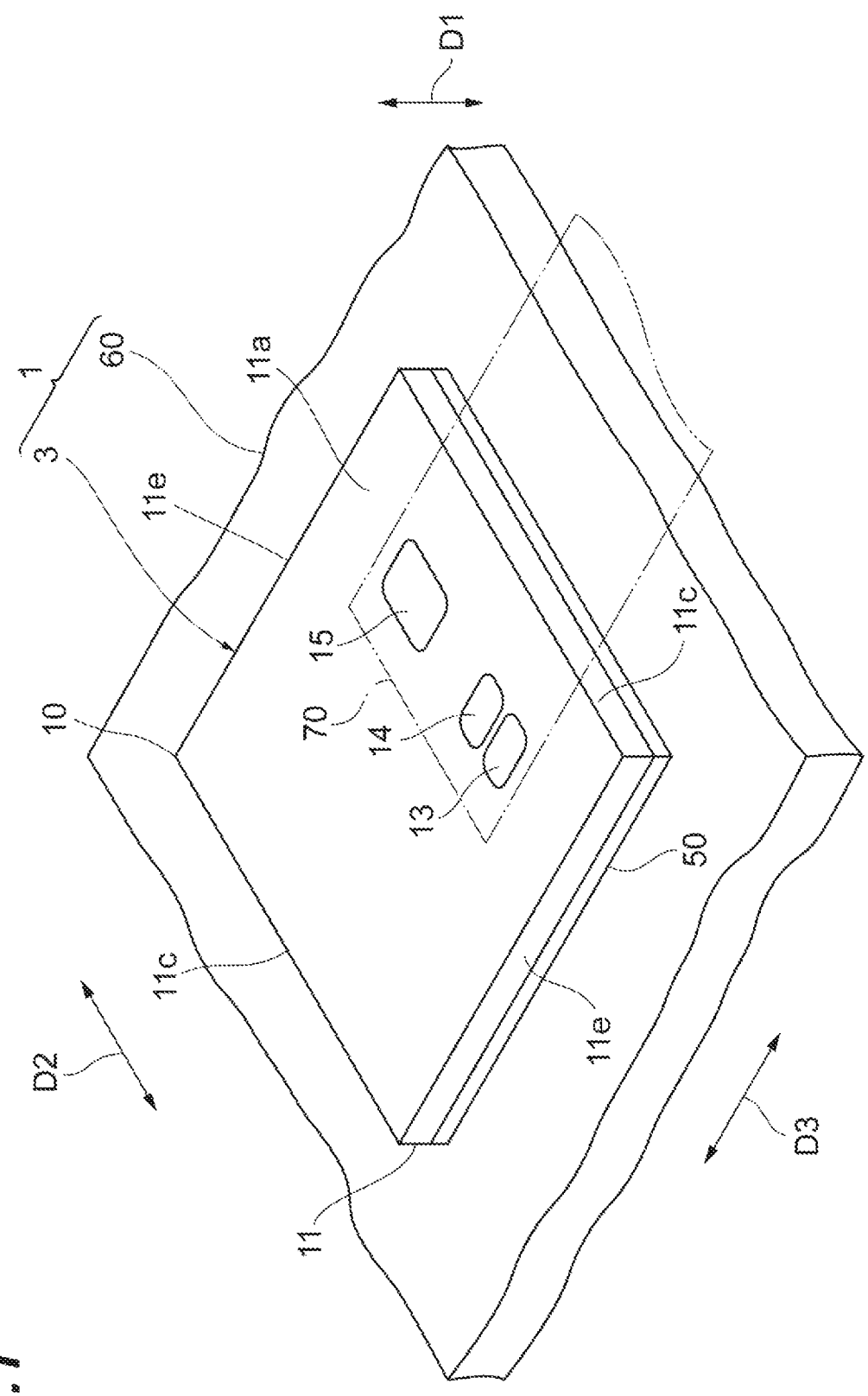
FIG. 1 is a perspective view illustrating an acoustic device according to an embodiment.

The piezoelectric element body 11 has a rectangular parallelepiped shape. The piezoelectric element body 11 includes a pair of principal surfaces 11a and 11b opposing each other, a pair of side surfaces 11c opposing each other, and a pair of side surfaces 11e opposing each other. Therefore, the piezoelectric element 10 includes the pair of principal surfaces 11a and 11b. The rectangular parallelepiped shape in this specification includes a rectangular parallelepiped shape in which each corner and each ridge are chamfered and a rectangular parallelepiped shape in which each corner and each ridge are rounded. A direction in which the pair of principal surfaces 11a and 11b opposes each other is a first direction D1. The first direction D1 is also a direction perpendicular to the principal surfaces 11a and 11b. A direction in which the pair of side surfaces 11e opposes each other is a second direction D2. The second direction D2 is also a direction perpendicular to each side surface 11e. A direction in which the pair of side surfaces 11c opposes each other is a third direction D3. The third direction D3 is also a direction perpendicular to each side surface 11c. For example, in a case where the principal surface 11b constitutes the first principal surface, the principal surface 11a constitutes the second principal surface.

Each of the principal surfaces 11a and 11b includes four sides. Each of the principal surfaces 11a and 11b has a rectangular shape. In the embodiment, each of the principal surfaces 11a and 11b has a square shape. In this case, the piezoelectric element 10 (piezoelectric element body 11) has a square shape in plan view. Each of the principal surfaces 11a and 11b may have a rectangular shape including a pair of long sides and a pair of short sides. The rectangular shape in this specification includes, for example, a shape in which each corner is chamfered and a shape in which each corner is rounded. Each of the principal surfaces 11a and 11b may have a circular shape. In this case, the piezoelectric element 10 (piezoelectric element body 11) has a disc shape.

The pair of side surfaces 11c extends in the first direction D1 to couple the pair of principal surfaces 11a and 11b. The pair of side surfaces 11c also extends in the second direction D2. The pair of side surfaces 11e extends in the first direction D1 to couple the pair of principal surfaces 11a and 11b. The pair of side surfaces 11e also extends in the third direction D3. A length of the piezoelectric element body 11 in the second direction D2 is, for example, 30 mm. A length of the piezoelectric element body 11 in the third direction D3 is, for example, 30 mm. A length of the piezoelectric element body 11 in the first direction D1, that is, a thickness of the piezoelectric element body 11 is 0.49 mm, for example. Each of the principal surfaces 11a and 11b and each of the side surfaces 11c and 11e may be indirectly adjacent to each other. In this case, a ridge portion is located between each of the principal surfaces 11a and 11b and each of the side surfaces 11c and 11e.

Figure 2:
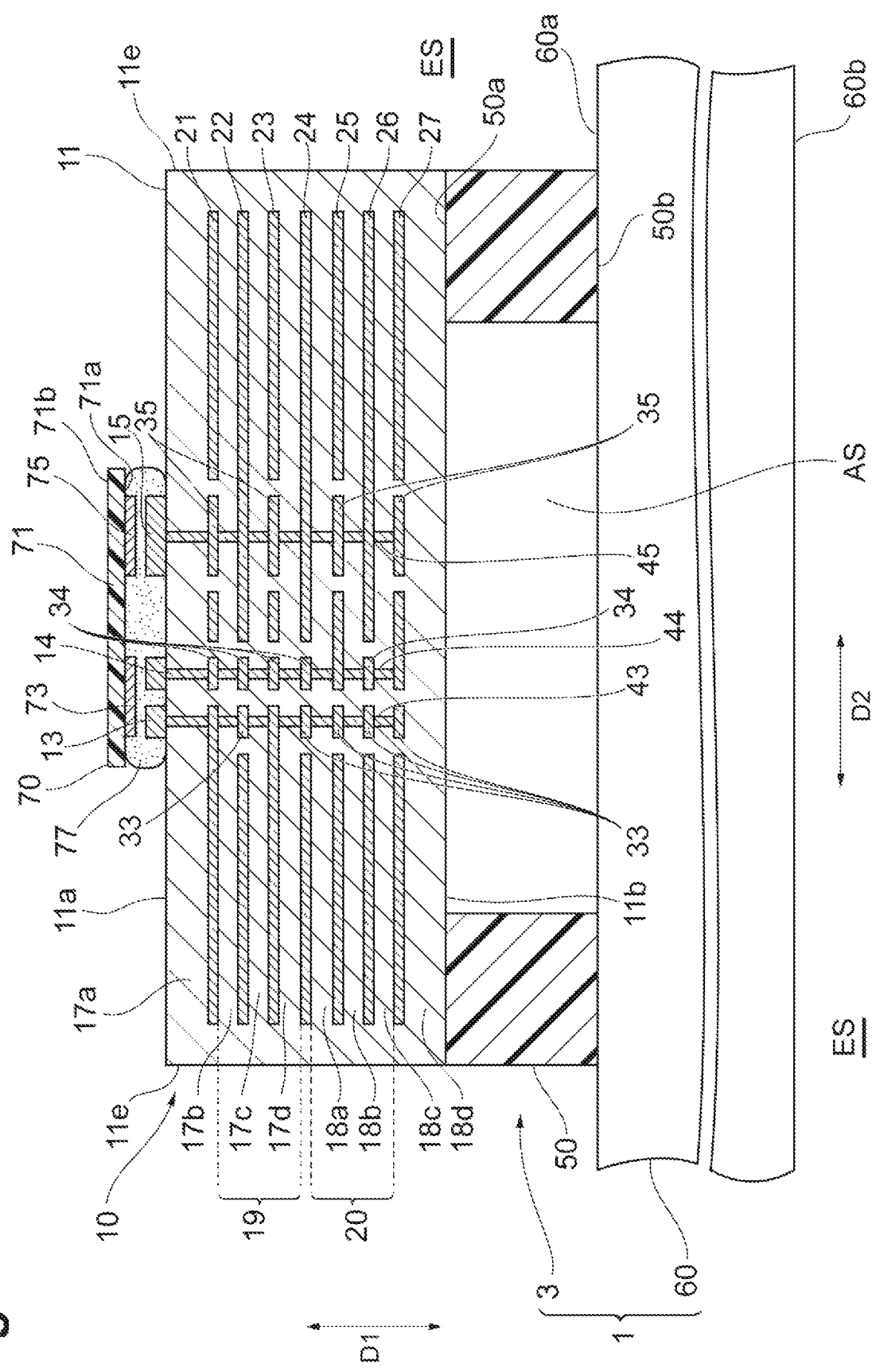
FIG. 2 is a view illustrating a cross-sectional configuration of the acoustic device according to the embodiment.

In the piezoelectric element body 11, as illustrated in FIGS. 2 and 3, a plurality of piezoelectric layers 17a, 17b, 17c, 17d, 18a, 18b, 18c, and 18d are stacked in the first direction D1. In the embodiment, the piezoelectric element body 11 includes eight piezoelectric layers 17a, 17b, 17c, 17d, 18a, 18b, 18c, and 18d. The piezoelectric layer 17a includes the principal surface 11a. The piezoelectric layer 18d includes the principal surface 11b. The piezoelectric layers 17b, 17c, 17d, 18a, 18b, and 18c are located between the piezoelectric layer 17a and the piezoelectric layer 18d. Polarization directions of the piezoelectric layers 17b, 17d, 18a, and 18c are opposite to polarization directions of the piezoelectric layers 17c and 18b. In the embodiment, the piezoelectric layers 17a, 17b, 17c, 17d, 18a, 18b, 18c, and 18d have the same thickness. In this specification, the term "same" includes a range of manufacturing error.

Each of the piezoelectric layers 17a, 17b, 17c, 17d, 18a, 18b, 18c, and 18d is made of a piezoelectric material. In the embodiment, each of the piezoelectric layers 17a, 17b, 17c, 17d, 18a, 18b, 18c, and 18d contains a piezoelectric ceramic material. The piezoelectric ceramic material includes, for example, PZT [$Pb(Zr,Ti)O_3$], PT($PbTiO_3$), PLZT [$(Pb,La)(Zr,Ti)O_3$], or barium titanate ($BaTiO_3$). Each of the piezoelectric layers 17a, 17b, 17c, 17d, 18a, 18b, 18c, and 18d includes, for example, a sintered body of a ceramic green sheet containing the above-mentioned piezoelectric ceramic material. In the actual piezoelectric element body 11, the piezoelectric layers 17a, 17b, 17c, 17d, 18a, 18b, 18c, and 18d are so integrated that the boundaries between the piezoelectric layers 17a, 17b, 17c, 17d, 18a, 18b, 18c, and 18d cannot be recognized.

Each of the external electrodes 13, 14, and 15 is disposed on the principal surface 11a. The external electrodes 13, 14, and 15 are disposed in the second direction D2 in the order of the external electrode 13, the external electrode 14, and the external electrode 15. The external electrode 13 and the external electrode 14 are adjacent to each other in the second direction D2. The external electrode 14 and the external electrode 15 are adjacent to each other in the second direction D2. In the second direction D2, the shortest distance between the external electrodes 14 and 15 is longer than the shortest distance between the external electrodes 13 and 14. Each of the external electrodes 13, 14, and 15 is separated from all edges (four sides) of the principal surface 11a when viewed from the first direction D1.

Each of the external electrodes 13, 14, and 15 has a rectangular shape when viewed from the first direction D1. Each of the external electrodes 13 and 14 has a rectangular shape including a pair of long sides and a pair of short sides when viewed from the first direction D1. In the embodiment, each of the external electrodes 13 and 14 has a rectangular shape in which each corner is rounded. The external electrode 15 has a square shape when viewed from the first direction D1. In the embodiment, the external electrode 15 has a square shape in which each corner is rounded. Each of the external electrodes 13, 14, and 15 contains an electrically conductive material. The electrically conductive material includes, for example, Ag, Pd, Pt, or Ag—Pd alloy. Each of the external electrodes 13, 14, and 15 is configured, for example, as a sintered body of an electrically conductive paste containing the above-mentioned electrically conductive material.

As illustrated in FIGS. 2 and 3, the piezoelectric element 10 includes a plurality of internal electrodes 21, 22, 23, 24, 25, 26, and 27 disposed in the piezoelectric element body 11. In the embodiment, the piezoelectric element 10 includes seven internal electrodes 21, 22, 23, 24, 25, 26, and 27. Each of the internal electrodes 21, 22, 23, 24, 25, 26, and 27 contains an electrically conductive material. The electrically conductive material includes, for example, Ag, Pd, Pt, or Ag—Pd alloy. Each of the internal electrodes 21, 22, 23, 24, 25, 26, and 27 is configured, for example, as a sintered body of an electrically conductive paste containing the above-mentioned electrically conductive material. In the embodiment, an outer shape of each of the internal electrodes 21, 22, 23, 24, 25, 26, and 27 is rectangular. Specifically, the outer shape of each of the internal electrodes 21, 22, 23, 24, 25, 26, and 27 includes a rectangular shape including a pair of long sides and a pair of short sides.

The internal electrodes 21, 22, 23, 24, 25, 26, and 27 are disposed at different positions (layers) in the first direction D1. The internal electrodes 21, 22, 23, 24, 25, 26, and 27 oppose each other with an interval therebetween in the first direction D1. The internal electrodes 21, 22, 23, 24, 25, 26, and 27 are not exposed on the surface of the piezoelectric element body 11. That is, the internal electrodes 21, 22, 23, 24, 25, 26, and 27 are not exposed on each of the side surfaces 11c and 11e. The internal electrodes 21, 22, 23, 24, 25, 26, and 27 are separated from all edges (four sides) of the principal surfaces 11a and 11b when viewed from the first direction D1.

The internal electrode 21 is located between the piezoelectric layer 17a and the piezoelectric layer 17b. The internal electrode 22 is located between the piezoelectric layer 17b and the piezoelectric layer 17c. The internal electrode 23 is located between the piezoelectric layer 17c and the piezoelectric layer 17d. The internal electrode 24 is located between the piezoelectric layer 17d and the piezoelectric layer 18a. The internal electrode 25 is located between the piezoelectric layer 18a and the piezoelectric layer 18b. The internal electrode 26 is located between the piezoelectric layer 18b and the piezoelectric layer 18c. The internal electrode 27 is located between the piezoelectric layer 18c and the piezoelectric layer 18d.

The external electrode 13 is electrically connected to the internal electrode 21, the internal electrode 23, and a plurality of connection conductors 33 through a plurality of via conductors 43. The plurality of connection conductors 33 are located in the same layer as the internal electrodes 22, 24, 25, 26, and 27, respectively. Each connection conductor 33 is located in an opening formed in each of the internal electrodes 22, 24, 25, 26, and 27. Each opening is formed at a position corresponding to the external electrode 13 when viewed from the first direction D1. Each connection conductor 33 is surrounded by each of the internal electrodes 22, 24, 25, 26, and 27 when viewed from the first direction D1. Each connection conductor 33 is separated from each of the internal electrodes 22, 24, 25, 26, and 27.

Each connection conductor 33 opposes the external electrode 13 in the first direction D1 and is disposed at a position overlapping the external electrode 13 when viewed from the first direction D1. Each connection conductor 33 opposes the internal electrodes 21 and 23 in the first direction D1 and is disposed at a position overlapping the internal electrodes 21 and 23 when viewed from the first direction D1. The plurality of via conductors 43 are located between the external electrode 13 and the internal electrode 21, between the internal electrode 21 and the connection conductor 33, between the internal electrode 23 and the connection conductor 33, and between the adjacent connection conductors 33, respectively. Each via conductor 43 is disposed at a position overlapping the external electrode 13 when viewed from the first direction D1. The plurality of via conductors 43 penetrate the corresponding piezoelectric layers 17a, 17b, 17c, 17d, 18a, 18b, and 18c, respectively, in the first direction D1.

The external electrode 14 is electrically connected to the internal electrode 25, the internal electrode 27, and the plurality of connection conductors 34 through a plurality of via conductors 44. The plurality of connection conductors 34 are located in the same layer as the internal electrodes 21, 22, 23, 24, and 26, respectively. Each connection conductor 34 is located in an opening formed in each of the internal electrodes 21, 22, 23, 24, and 26. Each opening is formed at a position corresponding to the external electrode 14 when viewed from the first direction D1. Each connection conductor 34 is surrounded by each of the internal electrodes 21, 22, 23, 24, and 26 when viewed from the first direction D1. Each connection conductor 34 is separated from each of the internal electrodes 21, 22, 23, 24, and 26. Each connection conductor 34 is separated from each connection conductor 33.

The connection conductor 33 and the connection conductor 34 located in the same layer as the internal electrode 22 are located adjacent to each other in the same opening. The connection conductor 33 and the connection conductor 34 located in the same layer as the internal electrode 24 are located adjacent to each other in the same opening. The connection conductor 33 and the connection conductor 34 located in the same layer as the internal electrode 26 are located adjacent to each other in the same opening.

Each connection conductor 34 opposes the external electrode 14 in the first direction D1 and is disposed at a position overlapping the external electrode 14 when viewed from the first direction D1. Each connection conductor 34 opposes the internal electrodes 25 and 27 in the first direction D1 and is disposed at a position overlapping the internal electrodes 25 and 27 when viewed from the first direction D1. The plurality of via conductors 44 are located between the external electrode 14 and the connection conductor 34, between the internal electrode 25 and the connection conductor 34, between the internal electrode 27 and the connection conductor 34, and between the adjacent connection conductors 34, respectively. The plurality of via conductors 44 are disposed at positions overlapping the external electrodes 14 when viewed from the first direction D1. The plurality of via conductors 44 penetrate the corresponding piezoelectric layers 17a, 17b, 17c, 17d, 18a, 18b, and 18c, respectively, in the first direction D1.

The external electrode 15 is electrically connected to the internal electrode 22, the internal electrode 24, the internal electrode 26, and the plurality of connection conductors 35 through a plurality of via conductors 45. The plurality of connection conductors 35 are located in the same layer as the internal electrodes 21, 23, 25, and 27, respectively. Each connection conductor 35 is located in an opening formed in each of the internal electrodes 21, 23, 25, and 27. Each opening is formed at a position corresponding to the external electrode 15 when viewed from the first direction D1. That is, an entire edge of each connection conductor 35 is surrounded by each of the internal electrodes 21, 23, 25, and 27 when viewed from the first direction D1. Each opening is formed at a position corresponding to the external electrode 15 when viewed from the first direction D1.

Each connection conductor 35 opposes the external electrode 15 in the first direction D1 and is disposed at a position overlapping the external electrode 15 when viewed from the first direction D1. Each connection conductor 35 opposes the internal electrodes 22, 24, and 26 in the first direction D1 and is disposed at a position overlapping the internal electrodes 22, 24, and 26 when viewed from the first direction D1. The plurality of via conductors 45 are located between the external electrode 15 and the connection conductor 35, between the internal electrode 22 and the connection conductor 35, between the internal electrode 24 and the connection conductor 35, and between the internal electrode 26 and the connection conductors 35, respectively. The plurality of via conductors 45 are disposed at positions overlapping the external electrode 15 when viewed from the first direction D1. The plurality of via conductors 45 penetrate the corresponding piezoelectric layers 17a, 17b, 17c, 17d, 18a, 18b, and 18c, respectively, in the first direction D1.

Each of the connection conductors 33, 34, and 35 has a rectangular shape when viewed from the first direction D1. Each of the connection conductors 33 and 34 has a rectangular shape including a pair of long sides and a pair of short sides when viewed from the first direction D1. In the embodiment, each of the connection conductors 33 and 34 has a rectangular shape in which each corner is rounded when viewed from the first direction D1. Each connection conductor 35 has a square shape when viewed from the first direction D1. In the embodiment, each connection conductor 35 has a square shape in which each corner is rounded when viewed from the first direction D1.

The connection conductors 33, 34, and 35 and the via conductors 43, 44, and 45 contain an electrically conductive material. The electrically conductive material includes, for example, Ag, Pd, Pt, or Ag—Pd alloy. The connection conductors 33, 34, and 35 and the via conductors 43, 44, and 45 are configured, for example, as a sintered body of an electrically conductive paste containing the above-mentioned electrically conductive material. The via conductors 43, 44, and 45 are formed by sintering the electrically conductive paste filled in the through-holes formed in the ceramic green sheet for forming the corresponding piezoelectric layers 17a, 17b, 17c, 17d, 18a, 18b, and 18c.

On the principal surface 11b of the piezoelectric element body 11, disposed are no conductor electrically connected to the internal electrodes 21 and 23, no conductor electrically connected to the internal electrodes 25 and 27, and no conductor electrically connected to the internal electrodes 22, 24, and 26. In the embodiment, when the principal surface 11b is viewed from the first direction D1, the entire principal surface 11b is exposed. The principal surfaces 11a and 11b are natural surfaces. The natural surface is a surface constituted by the surface of crystal grains grown by firing.

Also on each of the side surfaces 11c and 11e of the piezoelectric element body 11, disposed are no conductor electrically connected to the internal electrodes 21 and 23, no conductor electrically connected to the internal electrodes 25 and 27, and no conductor electrically connected to the internal electrodes 22, 24, and 26. In the embodiment, when each side surface 11c is viewed from the third direction D3, the entire side surface 11c is exposed. When each side surface 11e is viewed from the second direction D2, the entire side surface 11e is exposed. In the embodiment, each of the side surfaces 11c and 11e is also a natural surface.

In the plurality of piezoelectric layers 17b, 17c, and 17d, regions interposed between the internal electrodes 21 and 23 connected to the external electrode 13 and the internal electrodes 22 and 24 connected to the external electrode 15 constitute a first active region 19 that is piezoelectrically active. In the plurality of piezoelectric layers 18a, 18b, and 18c, regions interposed between the internal electrodes 25 and 27 connected to the external electrode 14 and the internal electrodes 24 and 26 connected to the external electrode 15 constitute a second active region 20 that is piezoelectrically active. The first active region 19 and the second active region 20 are disposed between the principal surface 11a and the principal surface 11b. The second active region 20 is disposed closer to the principal surface 11b than the first active region 19. The first active region 19 and the second active region 20 are configured with at least one piezoelectric layer.

In the embodiment, the first active region 19 and the second active region 20 are located to surround the plurality of external electrodes 13, 14, and 15 when viewed from the first direction D1. The first active region 19 and the second active region 20 includes a region located between the external electrode 14 and the external electrode 15 when viewed from the first direction D1 and a region outside the region where the external electrodes 13, 14, and 15 when viewed from the first direction D1 are located.

A region of the piezoelectric element body 11 that overlaps with the external electrodes 13 and 14 (connection conductors 33 and 34) when viewed from the first direction D1 is piezoelectrically inactive. A region of the piezoelectric element body 11 that overlaps with the external electrode 15 (connection conductor 35) when viewed from the first direction D1 is also piezoelectrically inactive. Hereinafter, the piezoelectrically inactive region will be referred to as an "inactive region". In the piezoelectric element 10, the inactive region is surrounded by the first active region 19 and the second active region 20 when viewed from the first direction D1. When viewed from the first direction D1, the inactive region is located to be deviated from a center of the piezoelectric element body 11 (principal surfaces 11a and 11b).

The spacer 50 is disposed between the piezoelectric element 10 and the member 60. The spacer 50 forms an acoustic space AS between the piezoelectric element 10 and the member 60. The acoustic space AS is defined by the piezoelectric element 10, the spacer 50, and the member 60. The spacer 50 is disposed on the principal surface 11b. The spacer 50 is an adhesive layer 51. That is, the spacer 50 includes the adhesive layer 51. In the embodiment, the spacer 50 includes only the adhesive layer 51.

The adhesive layer 51 includes a pair of principal surfaces 51a and 51b opposing each other. The principal surface 51a is in contact with the principal surface 11b. That is, the adhesive layer 51 (spacer 50) is in direct contact with the principal surface 11b. The principal surface 11b includes a region covered with the adhesive layer 51 (spacer 50) and a region exposed from the adhesive layer 51 (spacer 50). The spacer 50 adheres to the principal surface 11b due to adhesiveness of the adhesive layer 51. The adhesive layer 51 does not include electrically conductive fillers and has electric insulation. The adhesive layer 51 is made of, for example, a rubber-based adhesive. The adhesive layer 51 does not include a base material having no adhesiveness. A tensile strength of the adhesive layer 51 is 10 N/cm or more and 48 N/cm or less. A thickness of the adhesive layer 51 is, for example, 0.1 to 0.8 mm.

Figure 4A:
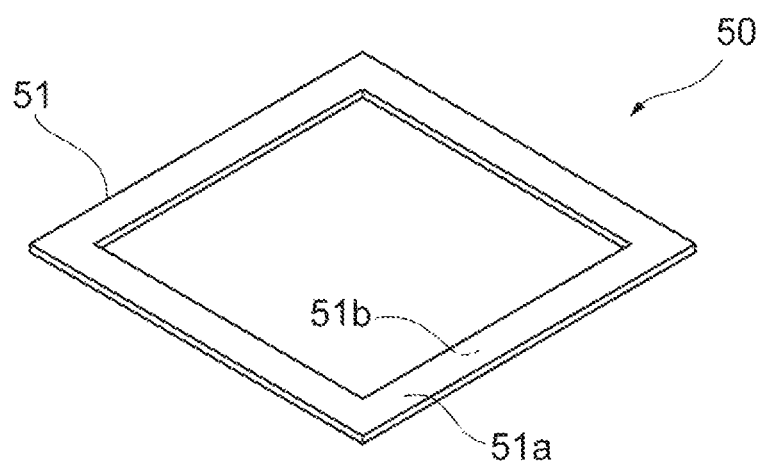
FIGS. 4A, 4B, and 4C are perspective views illustrating each example of a spacer.

Next, the configuration of the spacer 50 will be described with reference to FIGS. 4A, 4B, and 4C. The spacer 50 illustrated in FIGS. 4A and 4B has a frame shape. That is, the adhesive layer 51 also has a frame shape. The spacer 50 illustrated in FIGS. 4A and 4B has a rectangular frame shape in plan view. In a case where the spacer 50 has a rectangular frame shape in plan view, the spacer 50 includes a portion along each side of the principal surface 11b. The spacer 50 may have a polygonal frame shape or a circular frame shape in plan view.

Figure 4B:
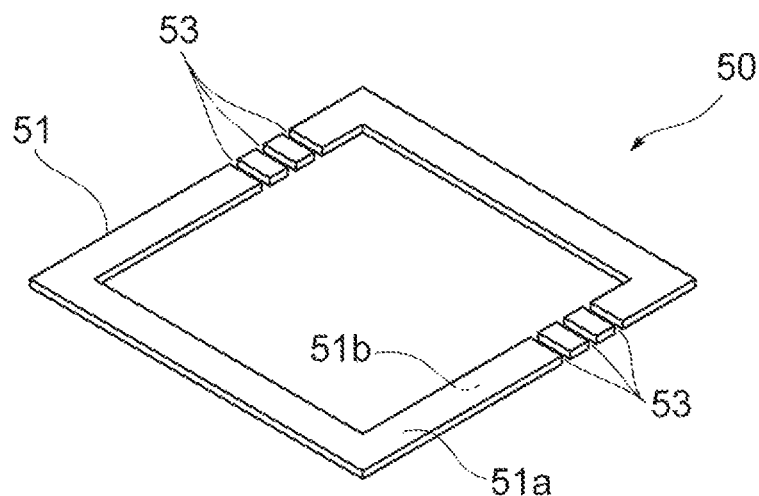

A slit 53 is formed in the spacer 50 illustrated in FIG. 4B. The slit 53 is formed to allow the inside and the outside of the spacer 50 having a frame shape to communicate with each other. The number of slits 53 formed may be one or plural. The slit 53 may penetrate the spacer 50 (adhesive layer 51) in the first direction D1. The first direction D1 is also the thickness direction of the spacer 50 (adhesive layer 51). The slit 53 may be formed in a bottomed shape. The acoustic space AS communicates with an external space ES through the slit 53.

Figure 4C:
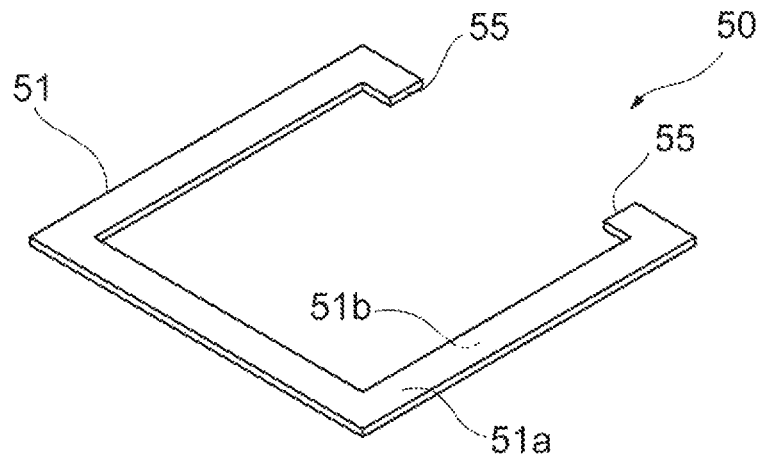

The spacer 50 illustrated in FIG. 4C includes a pair of ends 55 that are separated from each other. The spacer 50 includes, for example, portions along the three sides of the principal surface 11b. The spacer 50 may have a substantially "C" shape in plan view. The acoustic space AS communicates with the external space ES through a space between the pair of ends 55.

The member 60 includes principal surfaces 60a and 60b opposing each other. In the embodiment, the member 60 is a plate-shaped member. The member 60 is a vibration plate. The vibration device 3 is disposed on the principal surface 60a. The principal surface 51b is in contact with the principal surface 60a. That is, the adhesive layer 51 is in direct contact with the principal surface 60a. The adhesive layer 51 adheres to the principal surface 60a due to the adhesiveness of the adhesive layer 51. The piezoelectric element 10 is attached to the member 60 due to the adhesiveness of the adhesive layer 51. The adhesive layer 51 can peel off from the principal surface 11b and the principal surface 60a. The spacer 50 can peel off from the piezoelectric element 10 (piezoelectric element body 11) and the member 60. The adhesive layer 51 is located between the piezoelectric element 10 and the member 60. The member 60 opposes the principal surface 11b of the piezoelectric element 10.

Figure 5:
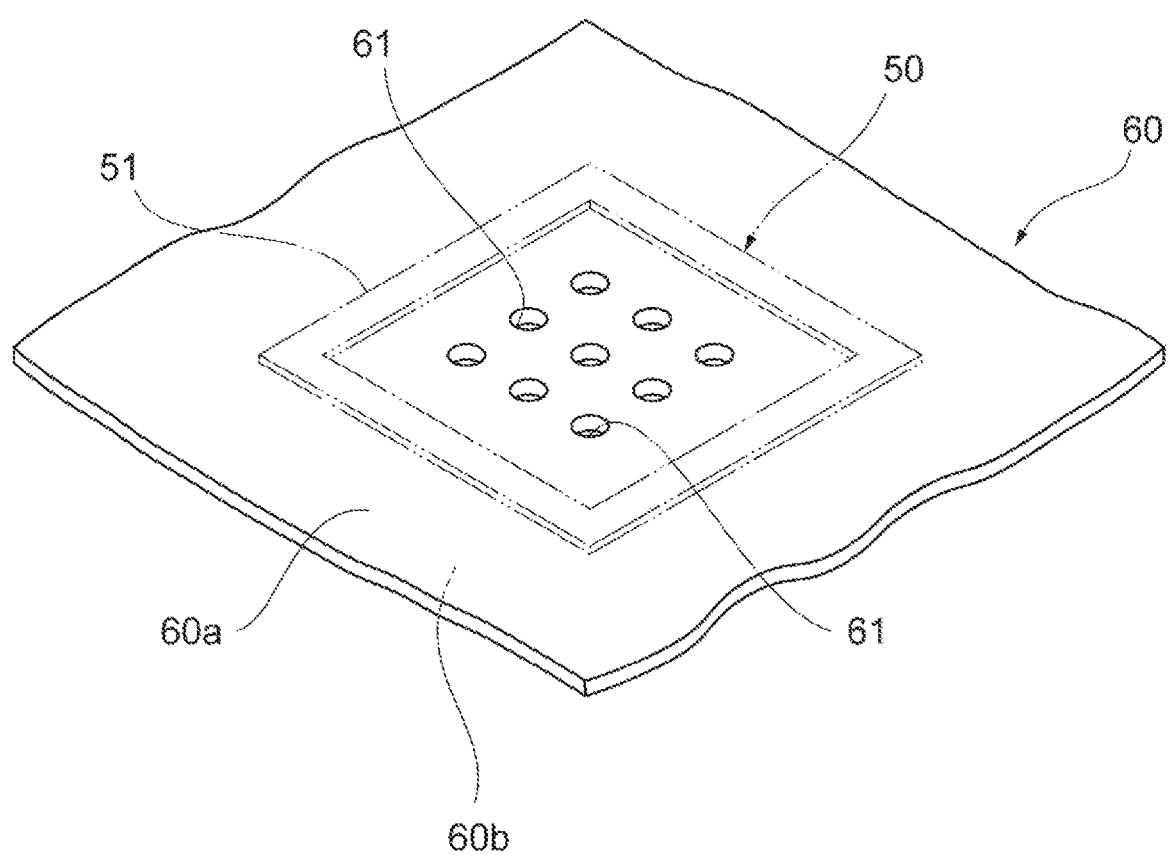
FIG. 5 is a perspective view illustrating an example of an attachment member.

A through-hole 61 may be formed in the member 60 as illustrated in FIG. 5. The through-hole 61 penetrates the member 60 in the first direction D1. The first direction D1 is also a thickness direction of the member 60. The through-hole 61 is formed at a position opposing the principal surface 11b of the piezoelectric element 10. The number of the through-holes 61 formed may be one or plural. The acoustic space AS communicates with the external space ES through the through-hole 61. The opening shape of the through-hole 61 is, for example, a circular shape or a polygonal shape. The through-hole 61 may not be formed in the member 60.

The member 60 may contain, for example, a synthetic resin. In this case, the member 60 contains, for example, an acrylic resin, a polyimide resin, a polycarbonate resin, an ABS resin (acrylonitrile-butadiene-styrene copolymer resin), a vinyl chloride resin, or a PET resin (polyethylene terephthalate resin). The member 60 may contain, for example, a metal. In this case, the member 60 contains, for example, Ni or an alloy thereof, Fe or an alloy thereof, Al or an alloy thereof, Mg or an alloy thereof, Cu or an alloy thereof, or stainless steel. The member 60 may contain, for example, a glass. The member 60 (principal surfaces 60a and 60b) has, for example, a rectangular shape when viewed from the first direction D1. A thickness of the member 60 is, for example, 0.01 to 50 mm.

As illustrated in FIGS. 1 and 2, a wiring member 70 is connected to the piezoelectric element 10. The wiring member 70 includes a base 71, a plurality of conductors 73 and 75, and a cover (not illustrated). In the embodiment, the wiring member 70 includes two conductors 73 and 75. The wiring member 70 is, for example, a flexible printed circuit board (FPC) or a flexible flat cable (FFC). The wiring member 70 may include a reinforcing member (not illustrated).

The base 71 has a strip shape. The base 71 includes a pair of principal surfaces 71a and 71b opposing each other. The base 71 has electric insulation. The base 71 is, for example, a layer made of a resin. The base 71 is made of, for example, a polyimide resin. A thickness of the base 71 is, for example, 25 μm.

The conductors 73 and 75 are disposed on the principal surface 71a. Each of the conductors 73 and 75 is bonded to the principal surface 71a with an adhesive layer (not illustrated). Each of the conductors 73 and 75 is made of, for example, Cu. Each of the conductors 73 and 75 may have a configuration in which an Ni-plated layer and an Au-plated layer are disposed in this order on a Cu layer. The conductor 73 and the conductor 75 are disposed to be separated from each other. A thickness of each of the conductor 73 and 75 is, for example, 20 μm.

The cover is disposed on the principal surface 71a. The cover covers a part of the conductor 73, a part of the conductor 75, and a part of the principal surface 71a. The cover is bonded to the parts of the conductor 73, conductor 75, and principal surface 71a that are covered with the cover, with an adhesive layer (not illustrated). The cover is a layer made of, for example, a resin. The cover is made of, for example, a polyimide resin. A thickness of the cover is, for example, 25 μm. The cover may be bonded to the principal surface 11a with a bonding member.

The wiring member 70 is bonded to the piezoelectric element 10 with a bonding member 77. Specifically, one end of the wiring member 70 is bonded to the external electrodes 13, 14, and 15 and the principal surface 11a with the bonding member 77. The bonding member 77 is a resin layer containing a plurality of electrically conductive particles (not illustrated) and has electric conductiveness. The electrically conductive particles are, for example, metal particles or gold-plated particles. The bonding member 77 contains, for example, a thermosetting elastomer. The bonding member 77 is formed by curing, for example, an anisotropic electrically conductive paste or an anisotropic electrically conductive film.

The bonding member 77 is located between the conductor 73 and the external electrodes 13 and 14. The conductor 73 and the external electrodes 13 and 14 are electrically connected through the electrically conductive particles contained in the bonding member 77. The bonding member 77 is located between the conductor 75 and the external electrode 15. The conductor 75 and the external electrode 15 are electrically connected through the electrically conductive particles contained in the bonding member 77.

The same voltage is applied to the external electrode 13 and the external electrode 14 through the conductor 73. Therefore, in a case where an electric field is generated in the piezoelectric layers 17b, 17c, and 17d in a direction along the polarization direction of the piezoelectric layers 17b, 17c, and 17d, an electric field is generated in the piezoelectric layers 18a, 18b, and 18c in a direction opposite to the polarization direction of the piezoelectric layers 18a, 18b, and 18c. In addition, in a case where an electric field is generated in the piezoelectric layers 17b, 17c, and 17d in a direction opposite to the polarization direction of the piezoelectric layers 17b, 17c, and 17d, an electric field is generated in the piezoelectric layers 18a, 18b, and 18c in a direction along the polarization direction of the piezoelectric layers 18a, 18b, and 18c. Consequently, the first active region 19 and the second active region 20 expand and contract in opposite directions, and the piezoelectric element 10 vibrates by bending.

As described above, in the acoustic device 1, the acoustic space AS is formed by the spacer 50 disposed between the piezoelectric element 10 and the member 60. That is, the piezoelectric element 10, the member 60, and the spacer 50 define the acoustic space AS. The piezoelectric element 10 is attached to the member 60 with the adhesive layer 51 because the adhesive layer 51 includes the principal surface 51a in contact with the principal surface 11b and the principal surface 51b in contact with the member 60. Therefore, although the acoustic device 1 does not include the housing as included in the acoustic device disclosed in the Republished Patent WO2006/016443, the acoustic device 1 can secure a sound pressure characteristic. The acoustic device 1 is miniaturized.

In a case where the spacer 50 has a frame shape, the spacer 50 forms the acoustic space AS easily.

In a case where the slit 53 is formed in the spacer 50, the acoustic space AS communicates with the external space ES through the slit 53. In this case, the acoustic device 1 can realize a desired sound pressure frequency characteristic.

In a case where the spacer 50 includes the pair of ends 55 that are separated from each other, the acoustic space AS communicates with the external space ES through the space between the pair of ends 55. In this case, the acoustic device 1 form the acoustic space AS easily and can realize a desired sound pressure frequency characteristic.

In a case where the through-hole 61 is formed in the member 60, the acoustic space AS communicates with the external space ES through the through-hole 61. In this case, the acoustic device 1 can realize a desired sound pressure frequency characteristic.

Next, a relationship between the tensile strength of the adhesive layer 51 and displacement of the piezoelectric element 10 and a relationship between the tensile strength of the adhesive layer 51 and sound pressure level of the acoustic device 1 will be described in detail.

The present inventors carried out the following tests in order to clarify the above-mentioned relationships. That is, the present inventors prepared Samples 1 to 17 having different tensile strengths of the adhesive layers 51 and confirmed the displacement and the sound pressure level in each of Samples 1 to 17. The result of the test is illustrated in FIG. 6. FIG. 6 is a table illustrating the displacement and the sound pressure level of each of Samples.

Each of Samples 1 to 17 is an acoustic device having the same configuration except that the tensile strength of the adhesive layer 51 is different. That is, each of Samples 1 to 17 includes the vibration device 3 and the attachment member 60 that are described above. The member 60 is a vibration plate made of a polycarbonate resin. The size of the vibration plate is 220 mm×220 mm, and the thickness of the vibration plate is 1 mm. In the test, the tensile strength of the adhesive layer 51 is allowed to be different by allowing an adhesive strength of the adhesive constituting the adhesive layer 51 to be different. The tensile strength of the adhesive layer 51 is obtained by a tensile test (ISO 29862).

In Sample 1, the tensile strength of the adhesive layer 51 is 5 N/cm. In Sample 2, the tensile strength of the adhesive layer 51 is 6 N/cm. In Sample 3, the tensile strength of the adhesive layer 51 is 7 N/cm. In Sample 4, the tensile strength of the adhesive layer 51 is 8 N/cm. In Sample 5, the tensile strength of the adhesive layer 51 is 10 N/cm. In Sample 6, the tensile strength of the adhesive layer 51 is 12 N/cm. In Sample 7, the tensile strength of the adhesive layer 51 is 14 N/cm. In Sample 8, the tensile strength of the adhesive layer 51 is 18 N/cm. In Sample 9, the tensile strength of the adhesive layer 51 is 24 N/cm.

In Sample 10, the tensile strength of the adhesive layer 51 is 30 N/cm. In Sample 11, the tensile strength of the adhesive layer 51 is 36 N/cm. In Sample 12, the tensile strength of the adhesive layer 51 is 42 N/cm. In Sample 13, the tensile strength of the adhesive layer 51 is 44 N/cm. In Sample 14, the tensile strength of the adhesive layer 51 is 46 N/cm. In Sample 15, the tensile strength of the adhesive layer 51 is 48 N/cm. In Sample 16, the tensile strength of the adhesive layer 51 is 50 N/cm. In Sample 17, the tensile strength of the adhesive layer 51 is 58 N/cm.

The displacement of each of Samples 1 to 17 was confirmed as follows.

A predetermined alternating voltage was applied to each of Samples 1 to 17, and the displacement of each of Samples 1 to 17 was directly measured. A laser displacement meter was used to measure the displacement of each of Samples 1 to 17. The value (measured value) obtained by the measurement was divided by the following calculated value and expressed as a percentage. The calculated value was calculated by simulation. In this simulation, the displacement of the acoustic device 1 of a case where the displacement of the piezoelectric element 10 is transmitted to the member 60 without being disturbed is calculated. The calculated displacement is the above-mentioned calculated value. The alternating voltage applied is a sine wave. In this test, the frequency of the alternating voltage is 250 Hz, and the amplitude of the voltage is ±6 V.

In each of Samples 5 to 15, the measured value was 90% or more of the calculated value, and thus, the effect of controlling a decrease in the displacement was confirmed. In each of Samples 1 to 3, 6, and 17, the measured value is less than 80% of the calculated value, and thus, the effect of controlling a decrease in the displacement tends not to be confirmed.

The sound pressure level of each of Samples 1 to 17 was confirmed as follows.

The above-mentioned predetermined alternating voltage was applied to each of Samples 1 to 17, and a sound pressure signal emitted from the acoustic device 1 was detected by a microphone. The sound pressure level of the detected sound pressure signal was obtained. The distance between the microphone and the member 60 is 1 m.

In each of Samples 5 to 15, the sound pressure level was more than 80 dB, and thus, the effect of controlling a decrease in the sound pressure level was confirmed. In each of Samples 1 to 3, 6, and 17, the sound pressure level is less than 75 dB, and thus, the effect of controlling a decrease in the displacement sound pressure level tends not to be confirmed.

As described above, in the acoustic device 1, the tensile strength of the adhesive layer 51 is 10 N/cm or more and 48 N/cm or less. Therefore, the acoustic device 1 controls a decrease in the displacement. Consequently, the acoustic device 1 controls a decrease in the sound pressure level.

In the piezoelectric element 10, as described above, the inactive region is surrounded by the first active region 19 and the second active region 20 when viewed from the first direction D1 and is located to be deviated from the center of the piezoelectric element body 11 (principal surfaces 11a and 11b). In this case, a position where the displacement is maximized may be deviated from the center of the piezoelectric element body 11 (principal surfaces 11a and 11b). Even in the acoustic device 1 (vibration device 3) including such the piezoelectric element 10, the acoustic device 1 controls a decrease in the sound pressure level because the tensile strength of the adhesive layer 51 is 10 N/cm or more and 48 N/cm or less.

As can be understood from the description of the above-described embodiments and modifications, the present specification includes disclosure of the aspects described below.

(Note 1) A vibration device, including:
a piezoelectric element including first and second principal surfaces opposing each other and being attached to an attachment member; and
a spacer disposed between the piezoelectric element and the attachment member in such a manner as to form an acoustic space between the piezoelectric element and the attachment member,
in which the spacer includes an adhesive layer having a principal surface in contact with the first principal surface and a principal surface in contact with the attachment member.

(Note 2) The vibration device according to Note 1,
in which a tensile strength of the adhesive layer is 10 N/cm or more and 48 N/cm or less.

(Note 3) The vibration device according to Note 1,
in which the adhesive layer is made of a rubber-based adhesive.

(Note 4) The vibration device according to Note 1,
in which the spacer has a frame shape.

(Note 5) The vibration device according to Note 4,
in which a slit is formed in the spacer, and
in which the acoustic space communicates with an external space through the slit.

(Note 6) The vibration device according to Note 1,
in which the spacer includes a pair of ends that are separated from each other, and
in which the acoustic space communicates with an external space through a space between the pair of ends.

(Note 7) The vibration device according to Note 1,
in which the spacer includes only the adhesive layer.

Although the embodiments and modifications of the present invention have been described above, the present invention is not necessarily limited to the embodiments and modifications, and the embodiment can be variously changed without departing from the scope of the invention.

The number of internal electrodes, the number of piezoelectric layers, and the number of external electrodes included in the piezoelectric element 10 are not limited to the numbers disclosed in the above-described embodiments.

The attachment member 60 may be a housing of an electronic device or the like. The member 60 may be a member different from the housing of the electronic device or the like. The member 60 may be, for example, a display panel or a film material. The display panel includes, for example, a flexible organic EL display panel.

The tensile strength of the adhesive layer 51 may be less than 10 N/cm or may be more than 48 N/cm. In a case where the tensile strength of the adhesive layer 51 is 10 N/cm or more and 48 N/cm or less, the acoustic device 1 suppresses a decrease in the sound pressure level, as described above.

What is claimed is:

1. An acoustic device comprising:
a piezoelectric element including first and second principal surfaces that are opposite surfaces of the piezoelectric element;
an attachment member to which the piezoelectric element is attached and that opposes the first principal surface; and
a spacer between the piezoelectric element and the attachment member; wherein
the piezoelectric element, the attachment member and the spacer are configured such that an acoustic space is between the piezoelectric element and the attachment member;
the spacer includes an adhesive layer that has third and fourth principal surfaces that are opposite surfaces of the adhesive layer;
the third principal surface is in direct contact with the first principal surface;
the fourth principal surface is in direct contact with the attachment member; and
the acoustic space is an air space defined by the first principal surface and the attachment member.

2. The acoustic device according to claim 1, wherein the adhesive layer is made of a rubber-based adhesive.

3. The acoustic device according to claim 1, wherein the spacer has a frame shape.

4. The acoustic device according to claim 3, wherein:
the spacer includes a slit; and
the acoustic space communicates with an external space through the slit.

5. The acoustic device according to claim 3, wherein
the first principal surface has a substantially rectangular shape,
the spacer includes four portions, each of the four portions (i) has the third and fourth principal surfaces and (ii) extends along a side of four sides of the first principal surface, and
the third and fourth principal surfaces have adhesiveness.

6. The acoustic device according to claim 3, wherein an entirety of the spacer has electric insulation.

7. The acoustic device according to claim 1, wherein
wherein the spacer includes a pair of ends that are spaced, and
the acoustic space communicates with an external space through a space between the pair of ends.

8. The acoustic device according to claim 1, wherein
the attachment member includes a through-hole opposite the first principal surface, and
the acoustic space communicates with an external space through the through-hole.

9. The acoustic device according to claim 1, wherein the piezoelectric element does not have an electrode on the first principal surface.

10. The acoustic device according to claim 1, wherein
the piezoelectric element (i) includes a piezoelectric element body including the first and second principal surfaces and (ii) is a sintered body, and
the first principal surface is a natural surface and is exposed to the acoustic space.

* * * * *